(12) United States Patent
Fukuchi

(10) Patent No.: US 11,539,221 B2
(45) Date of Patent: Dec. 27, 2022

(54) CHARGE-DISCHARGE CONTROL CIRCUIT INCLUDING CELL BALANCING CIRCUITS, CELL BALANCE DETECTION CIRCUITS, OVERCHARGE DETECTION CIRCUITS, AND A CONTROL CIRCUIT

(71) Applicant: ABLIC Inc., Tokyo (JP)

(72) Inventor: Shinya Fukuchi, Tokyo (JP)

(73) Assignee: ABLIC INC., Tokyo (JP)

( * ) Notice: Subject to any disclaimer, the term of this patent is extended or adjusted under 35 U.S.C. 154(b) by 94 days.

(21) Appl. No.: 16/895,739

(22) Filed: Jun. 8, 2020

(65) Prior Publication Data

US 2020/0395763 A1 Dec. 17, 2020

(30) Foreign Application Priority Data

Jun. 11, 2019 (JP) .............................. JP2019-108775
Aug. 1, 2019 (JP) .............................. JP2019-141959

(51) Int. Cl.
*H02J 7/00* (2006.01)

(52) U.S. Cl.
CPC .......... *H02J 7/0016* (2013.01); *H02J 7/0014* (2013.01); *H02J 7/0029* (2013.01); *H02J 7/00302* (2020.01); *H02J 7/0031* (2013.01)

(58) Field of Classification Search
CPC ...... H02J 7/0016; H02J 7/0014; H02J 7/0029; H02J 7/00302; H02J 7/0031; H02J 7/0019
USPC .......................................................... 320/118
See application file for complete search history.

(56) References Cited

U.S. PATENT DOCUMENTS

| 5,998,967 | A | | 12/1999 | Umeki et al. | |
|---|---|---|---|---|---|
| 5,998,974 | A | * | 12/1999 | Sudo ..................... | H02J 7/0031 320/136 |
| 9,525,298 | B1 | * | 12/2016 | Pham .................... | H02J 7/0016 |
| 2006/0082343 | A1 | * | 4/2006 | Sobue .................. | H02J 7/0016 320/119 |
| 2012/0306451 | A1 | * | 12/2012 | Arai ..................... | H02J 7/0016 320/134 |
| 2013/0026994 | A1 | * | 1/2013 | Morikawa ............. | H02J 7/0047 320/134 |
| 2013/0242446 | A1 | * | 9/2013 | Oshima ................. | H02H 3/207 361/86 |
| 2016/0172717 | A1 | * | 6/2016 | Nakatsuka ............. | B60L 58/22 320/112 |

(Continued)

FOREIGN PATENT DOCUMENTS

JP H11-234916 8/1999

*Primary Examiner* — Richard Isla
*Assistant Examiner* — Manuel Hernandez
(74) *Attorney, Agent, or Firm* — Crowell & Moring LLP

(57) ABSTRACT

A charge-discharge control circuit includes a first cell balancing circuit having a first switch; a second cell balancing circuit having a second switch; a first cell balance detection circuit having a third switch; a second cell balance detection circuit having a fourth switch; and a control circuit which outputs a control signal to turn on the first switch in a prescribed cycle according to the voltage of a first battery which is higher than or equal to a cell balance detection voltage, or outputs a control signal to turn on the second switch in the prescribed cycle according to the voltage of a second battery which is higher than or equal to the cell balance detection voltage, and outputs a control signal to turn off the third switch and the fourth switch in the prescribed cycle during output of the control signal.

3 Claims, 3 Drawing Sheets

(56) References Cited

U.S. PATENT DOCUMENTS

| | | | | |
|---|---|---|---|---|
| 2016/0197499 A1* | 7/2016 | Kaita | .................... | H02J 7/0029 |
| | | | | 320/103 |
| 2018/0076638 A1* | 3/2018 | Shibata | ................ | H02J 7/0036 |
| 2019/0052098 A1* | 2/2019 | Hong | .................... | G01R 31/36 |
| 2019/0317153 A1* | 10/2019 | Pan | ...................... | H02J 7/0047 |

* cited by examiner

CHARGE-DISCHARGE CONTROL CIRCUIT INCLUDING CELL BALANCING CIRCUITS, CELL BALANCE DETECTION CIRCUITS, OVERCHARGE DETECTION CIRCUITS, AND A CONTROL CIRCUIT

RELATED APPLICATIONS

This application claims priority to Japanese Patent Application No. 2019-108775, filed on Jun. 11, 2019, and Japanese Patent Application No. 2019-141959, filed on Aug. 1, 2019, the entire contents of which are incorporated herein by reference.

BACKGROUND OF THE INVENTION

1. Field of the Invention

The present invention relates to a charge-discharge control circuit and a battery device.

2. Description of the Related Art

FIG. 2 is a circuit diagram illustrating a conventional battery device including cell balancing circuits.

The conventional battery device includes a charge-discharge control circuit 20, batteries 21a, 21b, protective resistors 22a, 22b, an FET 23, cell balancing circuits 24a, 24b, and external terminals EB+, EB−. The charge-discharge control circuit 20 has cell balance detection circuits 25a, 25b, overcharge detection circuits 26a, 26b, a control circuit 27, a power-supply terminal VDD, a ground terminal VSS, input terminals VC1, VC2, and output terminals CB1, CB2, CO.

The charge-discharge control circuit 20 monitors the voltages of the batteries 21a, 21b, and the control circuit 27 turns the FET 23 on/off depending on the voltage conditions to control the voltages of the batteries 21a, 21b.

A charger is connected to the external terminals EB+, EB− to charge the batteries 21a, 21b, so that the voltages at the input terminals VC1, VC2 gradually increases. In the case where the voltage of either of the batteries, for example, the voltage of the battery 21a, that is, the voltage between the input terminals VC2 and VC1 becomes higher than or equal to the cell balance detection voltage, the cell balance detection circuit 25a provides a detection signal to the control circuit 27, Receiving the detection signal from the cell balance detection circuit 25a, the control circuit 27 provides a cell balance control signal to the cell balancing circuit 24a through the output terminal CB1. Receiving the cell balance control signal, the cell balancing circuit 24a turns the switch on to suppress the charging of the battery 21a, The charging rate of the battery 21a is accordingly slowed down compared with the battery 21b. In the case where the voltage of the battery 21b becomes higher than or equal to the cell balance detection voltage, the cell balancing circuit 24b suppresses the charging of the battery 21b in the same way.

Then, in the case where the voltages of the batteries 21a, 21b become higher than or equal to the overcharge detection voltage, the overcharge detection circuits 26a, 26b provide a detection signal to the control circuit 27. The control circuit 27 provides, from the output terminal CO, a control signal to turn off the FET 23 in order to stop charging of the batteries 21a, 21b.

The charge-discharge control circuit 20 carries out charging operation as described above to eliminate the voltage imbalance between the batteries 21a, 21b, that is, to perform cell balancing operation (for example, see Japanese Patent Application Laid-Open No. H11-234916).

In response to cost reduction requirements, a strategy to reduce the number of terminals in the charge-discharge control circuit 20 is considered. For example, the cell balancing circuits 24a, 24b can be incorporated in the charge-discharge control circuit 20 to eliminate the output terminals CB1, CB2.

However, in the case where the cell balancing circuits 24a, 24b are incorporated in the charge-discharge control circuit 20, since current flows through the protective resistors 22a, 22b during cell balancing operation, a voltage higher than or equal to a threshold value is applied to the gates of NMOS transistors in the cell balance detection circuits 25a, 25b and the overcharge detection circuits 26a, 26b, resulting in characteristic deterioration due to long-term use.

SUMMARY OF THE INVENTION

It is an object of the present invention to reduce the costs of a charge-discharge control circuit and a battery device without causing characteristic deterioration of transistors.

A charge-discharge control circuit according to an embodiment of the present invention includes a first cell balancing circuit having a first switch; a second cell balancing circuit having a second switch; a first cell balance detection circuit having a third switch, a second cell balance detection circuit having a fourth switch; and a control circuit configured to output a control signal to turn on the first switch in a prescribed cycle according to the voltage of a first battery which is higher than or equal to a cell balance detection voltage, output a control signal to turn on the second switch in the prescribed cycle according to the voltage of a second battery which is higher than or equal to the cell balance detection voltage, and output a control signal to turn off the third switch and the fourth switch in the prescribed cycle during output of the control signal.

Further, a battery device according to an embodiment of the present invention includes a plurality of batteries and an FET connected in series between a first external terminal and a second external terminal; and the charge-discharge control circuit which monitors the voltage of each of the plurality of batteries to control charging and discharging of the plurality of batteries by turning on/off the FET.

According to the charge-discharge control circuit of the present invention, since the cell balancing circuits are incorporated and the switches which turn on/off complementarily to the switches of the cell balancing circuits are provided in the cell balance detection circuits and other circuits, the number of terminals from which a cell balance signal is supplied can be reduced. In other words, the cost of the charge-discharge control circuit and the battery device can be reduced without causing characteristic deterioration of transistors in the detection circuits.

DETAILED DESCRIPTION OF THE PREFERRED EMBODIMENTS

Figure 1:
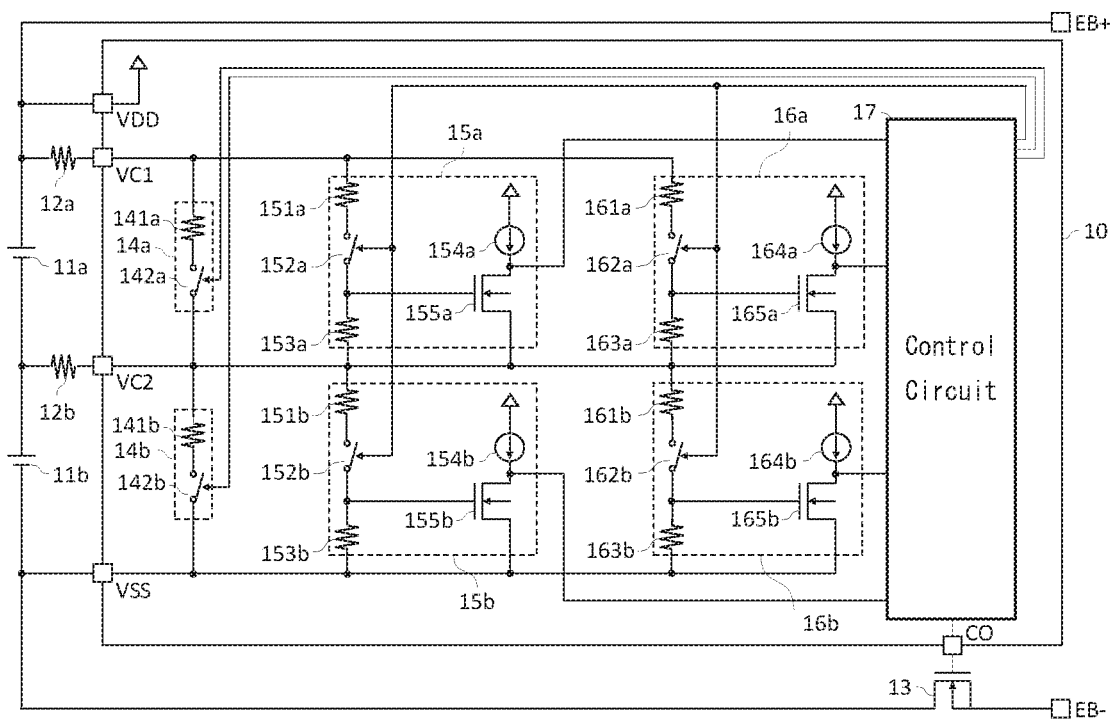
FIG. 1 is a circuit diagram illustrating a battery device having cell balancing circuits according to an embodiment of the present invention.
Figure 2:
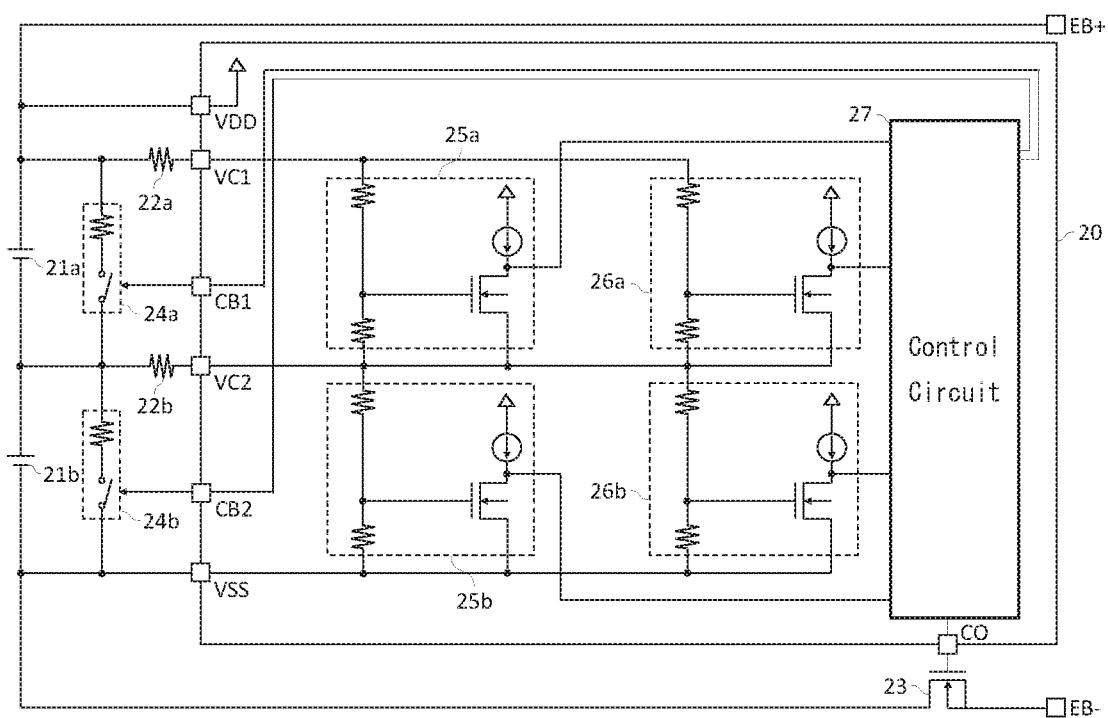
FIG. 2 is a circuit diagram illustrating a battery device including conventional cell balancing circuits.

FIG. 1 is a circuit diagram illustrating a battery device having cell balancing circuits according to an embodiment of the present invention.

The battery device includes a charge-discharge control circuit 10, batteries 11a and 11b, protective resistors 12a and 12b, an FET 13, and an external terminal EB+ and an external terminal EB−. The charge-discharge control circuit 10 has a power-supply terminal VDD, a ground terminal VSS, input terminals VC1, VC2, and an output terminal CO.

The batteries 11a, 11b and the FET 13 are connected in series between the external terminal EB+ and the external terminal EB−.

The battery 11a has a positive terminal connected to the power-supply terminal VDD and the input terminal VC1 through the protective resistor 12a, and a negative terminal connected to the positive terminal of the battery 11b and the input terminal VC2 through the protective resistor 12b. The negative terminal of the battery 11b is connected to the ground terminal VSS. The gate of the FET 13 is connected to the output terminal CO.

The charge-discharge control circuit 10 has cell balancing circuits 14a, 14b, cell balance detection circuits 15a, 15b, overcharge detection circuits 16a, 16b, and a control circuit 17.

The cell balancing circuit 14a has a resistor 141a and a switch 142a, and the cell balancing circuit 14b has a resistor 141b and a switch 142b.

In the cell balancing circuit Ha, the resistor 141a and the switch 142a are connected in series between the input terminal VC1 and the input terminal VC2, and a control terminal of the switch 142a is connected to a first output terminal of the control circuit 17. In the cell balancing circuit 14b, the resistor 141b and the switch 142b are connected in series between the input terminal VC2 and the ground terminal VSS, and a control terminal of the switch 142b is connected to a second output terminal of the control circuit 17.

The cell balance detection circuit 15a has a resistor 151a, a switch 152a, a resistor 153a, a current source 154a, and an NMOS transistor 155a, and the cell balance detection circuit 15b has a resistor 151b, a switch 152b, a resistor 153b, a current source 154b, and an NMOS transistor 155b.

The resistor 151a, the switch 152a, and the resistor 153a are connected in series between the input terminal VC1 and the input terminal VC2, and a connection point of the switch 152a and the resistor 153a is connected to the gate of the NMOS transistor 155a. The current source 154a and the NMOS transistor 155a are connected in series between the power-supply terminal VDD and the input terminal VC2. The drain of the NMOS transistor 155a, which is an output terminal, is connected to the first input terminal of the control circuit 17. The control terminal of the switch 152a is connected to the third output terminal of the control circuit 17.

The cell balance detection circuit 15b has the same structure as the cell balance detection circuit 15a, and the output terminal thereof is connected to the second input terminal of the control circuit 17.

The overcharge detection circuit 16a has a resistor 161a, a switch 162a, a resistor 163a, a current source 164a, and an NMOS transistor 165a, and the overcharge detection circuit 16b has a resistor 161b, a switch 162b, a resistor 163b, a current source 164b, and an NMOS transistor 165b.

The resistor 161a, the switch 162a, and the resistor 163a are connected in series between the input terminal VC1 and the input terminal VC2, and a connection point of the switch 162a and the resistor 163a is connected to the gate of the NMOS transistor 165a. The current source 164a and the NMOS transistor 165a are connected in series between the power-supply terminal VDD and the input terminal VC2. The drain of the NMOS transistor 165a, which is an output terminal, is connected to the third input terminal of the control circuit 17. The control terminal of the switch 162a is connected to the third output terminal of the control circuit 17.

The overcharge detection circuit 16b has the same structure as the overcharge detection circuit 16a, and the output terminal thereof is connected to the fourth input terminal of the control circuit 17.

The charge-discharge control terminal of the control circuit 17 is connected to the output terminal CO.

The operation of the battery device constructed as above will be described below.

The batteries 11a and 11b whose voltage is low due to discharging to a load are charged by a charger connected between the external terminal EB+ and the external terminal EB−. In the case where the voltages of the battery 11a and the battery 11b are lower than the cell balance voltage, all the cell balance detection circuits 15a, 15b and the overcharge detection circuits 16a, 16b do not send detection signals to the control circuit 17.

Since no detection signal is supplied, the control circuit 17 outputs control signals to turn off the switches from the first and second output terminals, and outputs a control signal to turn on the switches from the third output terminal. The cell balancing circuits 14a and 14b hence do not perform cell balancing operation. In this case, the cell balance detection circuits 15a, 15b and the overcharge detection circuits 16a, 16b carries out detection operation.

Next, the operation of the charge-discharge control circuit 10 in the case where the voltage of the battery 11a exceeds the cell balance voltage but the voltage of the battery 11b does not exceed the cell balance voltage will be described.

The cell balance detection circuit 15a detects that the voltage of the battery 11a exceeds the cell balance voltage, and outputs the cell balance detection signal from the output terminal to the first input terminal of the control circuit 17. Receiving the cell balance detection signal, the control circuit 17 outputs the cell balance control signal from the first output terminal to the cell balancing circuit 14a, and outputs a control signal for turning on/off of the switches from the third output terminal to the cell balance detection circuits 15a, 15b and the overcharge detection circuits 16a, 16b.

The cell balance control signal supplied from the first output terminal turns on/off the switch 142a of the cell balancing circuit 14a in a prescribed cycle. The switches of the cell balance detection circuits 15a, 15b and the overcharge detection circuits 16a, 16b are hence turned off in the on-state of the switch 142a or turned on in the off-state of the switch 142a by the control signal supplied from the third output terminal.

According to the turning on of the switch 142a, the cell balancing circuit 14a controls the voltage of the battery 11a by making a current flow through the protective resistor 12a and the protective resistor 12b. The voltage at the input terminal VC2 becomes higher than the voltage at the positive electrode of the battery 11b due to the flow of current through the protective resistor 12b. In other words, a voltage larger than or equal to the threshold value may be applied between the gate and source of the NMOS transistor 155b and the gate and source of the NMOS transistor 165b.

Since the switch 152b in the cell balance detection circuit 15b is turned off at this time, application of the voltage larger than or equal to the threshold value between the gate and source of the NMOS transistor 155b can be prevented. Likewise, since the switch 162b in the overcharge detection circuit 16b is also turned off, application of the voltage larger than or equal to the threshold value between the gate and source of the NMOS transistor 165b can be prevented.

Next, the operation of the charge-discharge control circuit 10 in the case where the voltage of the battery 11b exceeds the cell balance voltage but the voltage of the battery 11a does not exceed the cell balance voltage will be described.

The cell balance detection circuit 15b detects that the voltage of the battery 11b exceeds the cell balance voltage, and outputs the cell balance detection signal from the output terminal to the second input terminal of the control circuit 17. Receiving the cell balance detection signal, the control circuit 17 outputs the cell balance control signal from the second output terminal to the cell balancing circuit 14b, and outputs the control signal for turning on/off of the switches from the third output terminal to the cell balance detection circuits 15a, 15b and the overcharge detection circuits 16a, 16b.

The cell balance control signal supplied from the second output terminal turns on off the switch 142b of the cell balancing circuit 14b in the prescribed cycle. The switches of the cell balance detection circuits 15a, 15b and the overcharge detection circuits 16a, 16b are hence turned off in the on-state of the switch 142b or turned on in the off-state of the switch 142b by the control signal supplied from the third output terminal.

According to the turning on of the switch 142b, the cell balancing circuit 14b controls the voltage of the battery 11b by making a current flow through the protective resistor 12b. The voltage at the input terminal VC2 becomes lower than the voltage at the positive electrode of the battery 11b due to the flow of current through the protective resistor 12b. In other words, a voltage larger than or equal to the threshold value may be applied between the gate and source of the NMOS transistor 155a and the gate and source of the NMOS transistor 165a.

Since the switch 152a in the cell balance detection circuit 15a is turned off at this time, application of the voltage larger than or equal to the threshold value between the gate and source of the NMOS transistor 155a can be prevented. Likewise, since the switch 162a in the overcharge detection circuit 16a is also turned off, application of the voltage larger than or equal to the threshold value between the gate and source of the NMOS transistor 165a can be prevented. Since the switches in the cell balance detection circuits 15a, 15b and the overcharge detection circuits 16a, 16b are turned on while the switch 142a and the switch 142b are turned off, the voltage detection operation for the battery 11a and the battery 1 1b can be carried out without problems.

The charge-discharge control circuit 10 continues charge control while performing the above-described cell balancing operation for the battery 11a or the battery 11b. Then, the overcharge detection circuit 16a or the overcharge detection circuit 16b detects overcharge from the voltage of the battery 11a or the battery 11b which exceeds an overcharge voltage, and outputs an overcharge detection signal. Receiving the overcharge detection signal from the overcharge detection circuit 16a or the overcharge detection circuit 16b, the control circuit 17 stops the cell balancing operation, and outputs L level signal from the output terminal CO to the FET 13 to stop charging.

As described above, according to the charge-discharge control circuit of the present invention, since the cell balancing circuits are incorporated so that the switches which turn on/off complementarily to the switches of the cell balancing circuits are provided in the cell balance detection circuits and the overcharge detection circuits, the terminal from which a cell balance signal is supplied can be reduced. In other words, the costs of the charge-discharge control circuit and the battery device can be reduced.

Figure 3:
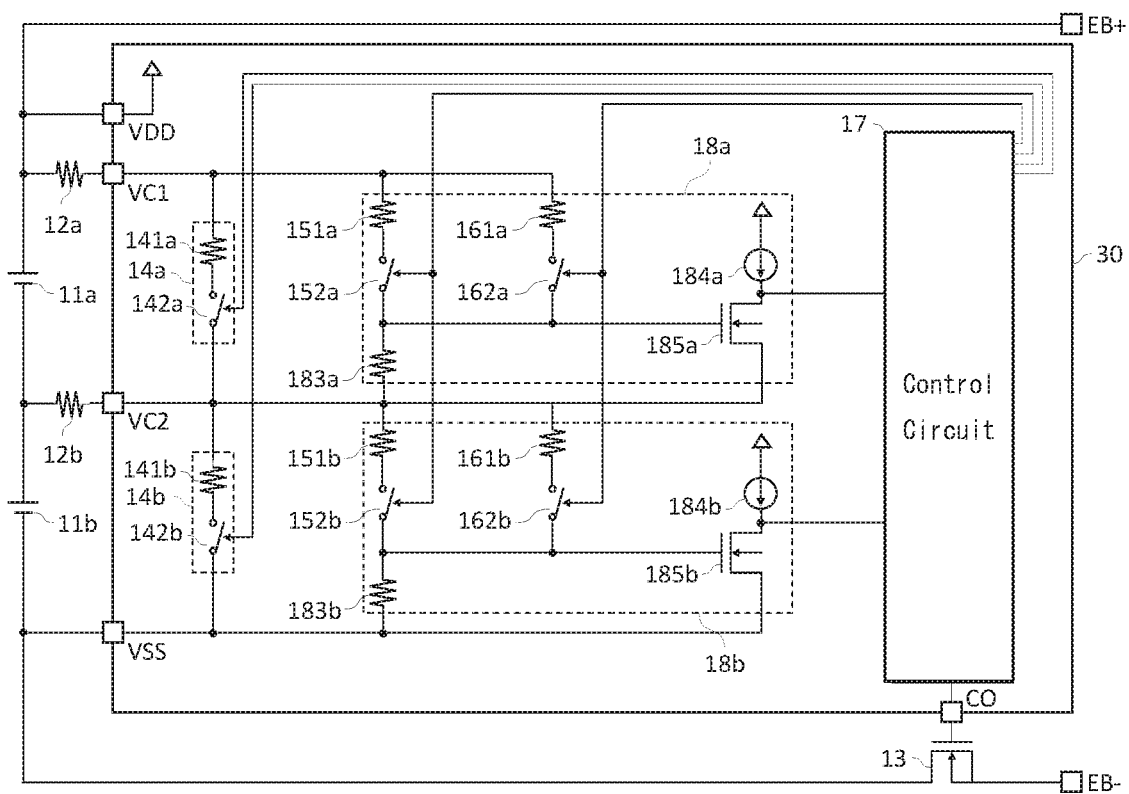
FIG. 3 is a circuit diagram illustrating another battery device having cell balancing circuits according to an embodiment of the present invention.

FIG. 3 is a circuit diagram illustrating another example of a battery device having cell balancing circuits according to the embodiment of the present invention.

In FIG. 3 a charge-discharge control circuit 30 has voltage detection circuits 18a, 18b in both of which a cell balancing circuit and an overcharge detection circuit are constructed in common. Since other part of the circuit structure is identical to that of the charge-discharge control circuit 10, duplicated explanations will be omitted.

The voltage detection circuit 18a has a resistor 151a, a switch 152a, a resistor 183a, a resistor 161a, a switch 162a, a current source 184a, and an NMOS transistor 185a, and the voltage detection circuit 18b has a resistor 151b, a switch 152b, a resistor 183b, a resistor 161b, a switch 162b, a current source 184b, and art NMOS transistor 185b.

That is, the voltage detection circuit 18a has a resistor 183a, which works commonly as the resistor 153a of the cell balancing circuit 15a and the resistor 163a of the overcharge detection circuit 16a, a current source 184a and an NMOS transistor 185a, which works commonly as the current source 154a and the NMOS transistor 155a of the cell balancing circuit 15a, and the current source 164a and the NMOS transistor 165a of the overcharge detection circuit 16a. And the voltage detection circuit 18b has a resistor 183b, which works commonly as the resistor 153b of the cell balancing circuit 15b and the resistor 163b of the overcharge detection circuit 16b, a current source 184b and an NMOS transistor 185b, which works commonly as the current source 154b and the NMOS transistor 155b of the cell balancing circuit 15b, and the current source 164b and the NMOS transistor 165b of the overcharge detection circuit 16b.

In the voltage detection circuit 18a, appropriate selection of the resistance ratio between the resistor 151a and the resistor 183a and the resistance ratio between the resistor 161a and the resistor 183a enables common use of the resistor 183a, the current source 184a and the NMOS transistor 185a, and appropriate selection of the resistance ratio between the resistor 151b and the resistor 183b and the resistance ratio between the resistor 161b and the resistor 183b enables common use of the resistor 183b, the current source 184b and the NMOS transistor 185b.

In the configuration described above since the resistors, the current sources and the NMOS transistors can be reduced, further reduction of cost for the charge-discharge control circuit and the battery device can be possible While the embodiment of the present invention has been described, the present invention is not limited to the aforementioned embodiment, and various changes can be made without departing from the gist of the present invention.

For example, the structure of two batteries is taken as an example in the aforementioned embodiment, but the number of batteries may be three or more. Further, the structure includes the overcharge detection circuits and the EFT for charge control, but the structure may also include overdischarge detection circuits and an FET for discharge control.

Further, in the cell balance detection circuit 15a(15b), the connection relationship between the resistor 151a(151b) and the switch 152a(152b) may be replaced with each other. Likewise, in the overcharge detection circuit 16a(16b), the connection relationship between the resistor 161a(161b) and the switch 162a(162b) may be replaced with each other.

What is claimed is:

1. A charge-discharge control circuit configured to control charging and discharging of a plurality of batteries connected in series, comprising:
    a first input terminal to which a positive electrode of a first battery is connected through a first protective resistor;
    a second input terminal to which a negative electrode of the first battery and a positive electrode of a second battery are connected through a second protective resistor;
    a ground terminal to which a negative electrode of the second battery is connected;
    a first cell balancing circuit connected between the first input terminal and the second input terminal and having a first switch;
    a second cell balancing circuit connected between the second input terminal and the ground terminal and having a second switch;
    a first cell balance detection circuit connected between the first input terminal and the second input terminal and having a third switch;
    a second cell balance detection circuit connected between the second input terminal and the ground terminal and having a fourth switch;
    a control circuit configured to output a first control signal to turn on the first switch in a prescribed cycle according to a voltage of the first battery which is higher than or equal to a cell balance detection voltage, output a second control signal to turn on the second switch in the prescribed cycle according to a voltage of the second battery which is higher than or equal to the cell balance detection voltage, and output a third control signal to turn off the third switch and the fourth switch in the prescribed cycle while at least one of the first control signal turns on the first switch in the prescribed cycle or the second control signal turns on the second switch in the prescribed cycle;
    a first overcharge detection circuit connected between the first input terminal and the second input terminal and having a fifth switch; and
    a second overcharge detection circuit connected between the second input terminal and the ground terminal and having a sixth switch,
    wherein the control circuit is configured to output the third control signal to turn off the fifth switch and the sixth switch in the prescribed cycle while at least one of the first control signal turns on the first switch in the prescribed cycle or the second control signal turns on the second switch in the prescribed cycle.

2. A battery device comprising:
    a plurality of batteries and an FET connected in series between a first external terminal and a second external terminal; and
    the charge-discharge control circuit according to claim 1 which monitors the voltage of each of the plurality of batteries to control charging and discharging of the plurality of batteries by turning on/off the FET.

3. The charge-discharge control circuit of claim 1, wherein the first cell balancing circuit comprises a first cell balancing resistor that is different from the first protective resistor and the second protective resistor, and
    wherein the second cell balancing circuit comprises a second cell balancing resistor that is different from the first protective resistor and the second protective resistor.

* * * * *